(12) United States Patent
Pietrangeli et al.

(10) Patent No.: US 10,184,329 B2
(45) Date of Patent: Jan. 22, 2019

(54) MICROEMULSIONS, MESOPHASE SURFACTANT AND MICELLAR SOLUTIONS, AND IN SITU-FORMED FLUIDS FORMULATED WITH HIGH DENSITY BRINE

(71) Applicant: BAKER HUGHES INCORPORATED, Houston, TX (US)

(72) Inventors: Gianna A. Pietrangeli, Houston, TX (US); Lirio Quintero, Houston, TX (US); Ana Forgiarini, Merida (VE)

(73) Assignee: Baker Hughes, a GE company, LLC, Houston, TX (US)

( * ) Notice: Subject to any disclaimer, the term of this patent is extended or adjusted under 35 U.S.C. 154(b) by 508 days.

(21) Appl. No.: 14/880,851

(22) Filed: Oct. 12, 2015

(65) Prior Publication Data

US 2016/0102239 A1    Apr. 14, 2016

Related U.S. Application Data

(60) Provisional application No. 62/063,635, filed on Oct. 14, 2014.

(51) Int. Cl.
*E21B 37/00* (2006.01)
*E21B 43/16* (2006.01)
(Continued)

(52) U.S. Cl.
CPC .............. *E21B 43/16* (2013.01); *C09K 8/524* (2013.01); *E21B 37/00* (2013.01); *C09K 8/584* (2013.01)

(58) Field of Classification Search
None
See application file for complete search history.

(56) References Cited

U.S. PATENT DOCUMENTS 7,134,496 B2    11/2006    Jones et al.
8,091,645 B2     1/2012    Quintero et al.
(Continued)

OTHER PUBLICATIONS

Int'l Search Report & Written Opinion in PCT/US2015/055334, dated Jan. 15, 2016.
(Continued)

*Primary Examiner* — Anuradha Ahuja
(74) *Attorney, Agent, or Firm* — Mossman, Kumar & Tyler, P.C.

(57) ABSTRACT

Mesophase surfactant solutions and/or micellar solutions, pre-formed single phase microemulsions (SPMEs), and in situ-formed fluids may be used to clean up and remove hydrocarbons and synthetic oils such as oil-based mud filter cake and near wellbore damage in oil and gas wells. Removal occurs by solubilization of the hydrocarbons and synthetic oils into the micellar solutions, SPME, in situ-formed fluids, etc. when the fluid formulation contacts the hydrocarbons and synthetic oils. An in situ-formed fluid (e.g. microemulsion), may be formed when one or more surfactant, an optional linker, optional co-surfactant, optional acid, optional co-solvent and a polar high-density brine phase, and eventually some amount of organic phase, contacts the subterranean location and solubilizes the hydrocarbons and synthetic oils encountered, such as in the near wellbore of a subterranean formation. The micellar solutions, microemulsions, in situ-formed fluids, etc. are effective for removing the formation damage caused by hydrocarbons and synthetic oils.

13 Claims, 2 Drawing Sheets

(51) Int. Cl.
 *C09K 8/584* (2006.01)
 *C09K 8/524* (2006.01)

(56) References Cited

U.S. PATENT DOCUMENTS

| | | | |
|---|---|---|---|
| 8,091,646 B2 | 1/2012 | Quintero et al. | |
| 8,235,120 B2 | 8/2012 | Quintero et al. | |
| 8,246,696 B2 | 8/2012 | Man et al. | |
| 8,697,622 B2 | 4/2014 | Man et al. | |
| 2008/0110618 A1* | 5/2008 | Quintero | C09K 8/32 166/278 |
| 2009/0008091 A1* | 1/2009 | Quintero | C09K 8/524 166/270.1 |
| 2009/0183877 A1* | 7/2009 | Quintero | C09K 8/584 166/300 |
| 2009/0286701 A1* | 11/2009 | Davidson | C09K 8/52 507/235 |
| 2012/0000708 A1* | 1/2012 | van Zanten | C09K 8/12 175/57 |
| 2012/0073817 A1 | 3/2012 | Van Zanten | |

OTHER PUBLICATIONS

J. L. Salager and R. E. Anton, "Ionic Microemulsions", Chapter 8, in P. Kumar and K. L. Mittal, ed. Handbook of Microemulsion Science and Technology, Marcel Dekker Inc. New York, pp. 247-280 (1999).

S. Ezrahi, A. Aserin and N. Garti, "Chapter 7: Aggregation Behavior in One-Phase (Winsor IV) Microemulsion Systems", in P. Kumar and K. L. Mittal, ed., Handbook of Microemulsion Science and Technology, Marcel Dekker, Inc., New York, pp. 185-246 (1999).

J. L. Salager, "Emulsion Phase Inversion Phenomena" in Emulsions and Emulsion Stability, J. Sjoblöm Ed., 2nd Edition, Chap. 4, pp. 185-226, Taylor and Francis, London (2006).

G. Pietrangeli, et al., "Enhanced Oil Solubilization Using Microemulsions With Linkers," SPE164131, Symposium on Oilfield Chemistry, The Woodlands, TX (Apr. 2013).

L. Quintero, et al., "Optimization of Microemulsion Formulations With Linker Molecules," SPE165207, SPE European Formation Damage Conference and Exhibition, Noordwijk, The Netherlands (Jun. 2013).

* cited by examiner

MICROEMULSIONS, MESOPHASE SURFACTANT AND MICELLAR SOLUTIONS, AND IN SITU-FORMED FLUIDS FORMULATED WITH HIGH DENSITY BRINE

CROSS-REFERENCE TO RELATED APPLICATION

This application claims the benefit of U.S. Provisional Patent Application Ser. No. 62/063,635 filed Oct. 14, 2014, incorporated herein by reference in its entirety.

TECHNICAL FIELD

The present invention relates to methods and compositions for reducing or removing hydrocarbon, synthetic oils, and non-polar materials and damage they cause in and near wellbores and subterranean reservoirs, and more particularly relates, in one non-limiting embodiment, to methods and compositions for reducing or removing non-polar materials and damage caused thereby from subterranean reservoirs using microemulsions formulated with high-density brines.

BACKGROUND

Formation damage involves undesirable alteration of the initial characteristics of a producing formation, typically by exposure to drilling fluids and completion fluids and in some cases during the production phase of the well. The adsorption of additives present in the drilling or completion fluids to the rock or the invasion of solid particles from the drilling fluids tends to decrease the effective pore volume and effective permeability of the producible formation in the near-wellbore region. There may be at least four possible mechanisms at work. First, solid particles from the drilling fluid may physically plug or bridge across flowpaths in the porous formation. Second, when water contacts certain clay minerals in the formation, the clays typically swell, thus increasing in volume and in turn decreasing the pore volume. Third, chemical reactions or fluids incompatibility between the drilling fluid or completion fluids or intervention fluids and the formation fluids or the rock and fluids may precipitate solids or semisolids that plug pore spaces. Four, rock wettability alteration by fluids pumped downhole. Another mechanism of formation damage is the organic and inorganic deposits in the near wellbore region, either by reaction between fluids or during the production phase of the wells.

Reduced hydrocarbon production can result from reservoir damage when a drilling mud deeply invades the subterranean reservoir. It will also be understood that the drilling fluid, e.g. oil-based mud (OBM), is deposited and concentrated at the borehole face and partially inside the formation. Many operators are interested in improving formation clean up and removing the invert emulsion filter cake or plugging material or improving formation damage after drilling into reservoirs with OBMs.

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds".

Drilling fluids are typically classified according to their base fluid. In water-based muds, solid particles are suspended in water or brine. Oil can be emulsified in the water which is the continuous phase. Brine-based drilling fluids, of course are a water-based mud (WBM) in which the aqueous component is brine. Optionally, a water-based mud may be free or essentially free from oil.

Oil-based muds (OBM) are the opposite or inverse. Solid particles are suspended in the oil, and water or brine is emulsified in the oil and therefore the oil is the continuous phase. Oil-based muds can be either all-oil based or water-in-oil macroemulsions, which are also called invert emulsions. In oil-based mud, the oil may consist of any oil that may include, but is not limited to, diesel, mineral oil, esters, paraffin, or alpha-olefins. OBMs as defined herein also include syntheticbased fluids or muds (SBMs) which are synthetically produced rather than refined from naturally-occurring materials. SBMs often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types.

U.S. Pat. No. 7,134,496 relates to methods of removing an invert emulsion filter cake after a drilling process using a single phase microemulsion. U.S. Pat. No. 8,091,645 concerns in-situ fluid formation for cleaning oil- or synthetic oil-based mud. U.S. Pat. No. 8,091,646 involves single phase microemulsions and in-situ microemulsions for cleaning formation damage. All of these U.S. patents are assigned to Baker Hughes and are incorporated by reference herein in their entirety.

It would be desirable if compositions and methods could be devised to aid and improve the ability to clean up formation damage, oil-based filter cake, and near wellbore damage and to remove it more completely and easily, without causing additional damage to the formation.

SUMMARY

There is provided, in one non-limiting form, a method of removing at least a portion of non-polar material from a subterranean location containing non-polar material, where the method includes introducing a fluid formulation to the subterranean location to contact the fluid formulation with the non-polar material present at the subterranean location. The fluid formulation may comprise one of three different sets of components: (1) a mesophase surfactant solution or micellar solution, which comprises: at least one surfactant, optionally at least one linker, optionally at least one acid and a high-density brine comprising a salt; (2) a single-phase microemulsion (SPME), which comprises: at least one surfactant, at least one non-polar fluid, optionally at least one linker, optionally at least one acid and a high-density brine comprising a salt; and/or (3) in situ fluid-forming components comprising: at least one surfactant, optionally at least one linker, optionally at least one acid and a high-density brine comprising a salt. The method further involves incorporating at least part of the non-polar material into an incorporating fluid selected from the group consisting of (1) the mesophase surfactant solution and/or the micellar solution, (2) the SPME and (3) a different fluid formed in situ downhole at the subterranean location, where in the latter case the method further comprises forming the different fluid in situ from the in situ fluid-forming components, and the different in situ-formed fluid is selected from the group consisting of microemulsions, nanoemulsions, macroemulsions, miniemulsions, swollen micellar dispersion, multiple emulsions, and combinations thereof. After incorporating, the method additionally involves removing the incorporating fluid that incorporates or "absorbs" the hydrocarbons and synthetic oils from the subterranean location. The optional linker includes, but is not necessarily limited to, amines, carboxylic acids, alcohols with more than 8 carbon atoms, glycols, polyols, phenols, and combinations thereof. The high-density brine has a density higher than 15 lb/gal up to 21 lb/gal (higher than 1800 up to about 2500 kg/m$^3$).

An acid may be optionally used to solubilize the contaminant solid particles in the formation. The acid may be a mineral acid and/or an organic acid, and in one non-limiting embodiment may be an in-situ acid formed with a precursor acid and/or polyamino carboxylic acid (PACA), or other acid in situ-forming components. The acid may also include diacids (e.g. polycarboxylic diacids), triacids, tetracids (e.g. EDTA or HEDTA) and combinations of these. Oxidizing agents, water-soluble enzymes (e.g. catalysts), barite dissolvers (e.g. chelants), and combinations thereof may also be used in the fluids herein. Precursors to these components may also be employed, in other words, these additional components may be generated or activated in situ in the subterranean reservoir and/or downhole.

The microemulsions and other incorporating fluids of this method may involve or include thermodynamically stable, macroscopically homogeneous, single phase microemulsions (Winsor IV) or Winsor III microemulsions that include a polar phase, a nonpolar phase, a surfactant, and optionally a co-surfactant, linker, and acid.

DETAILED DESCRIPTION

It has been discovered that subterranean reservoir formation damage caused by non-polar materials, including but not necessarily limited to, oil-based mud filter cake, oil-based mud, synthetic-based mud, paraffins, asphaltenes, slugs, emulsions, near-wellbore damage caused by these materials, and combinations thereof may be removed, healed, restored or otherwise remediated, and that these non-polar materials may also be removed, using new microemulsions and in situ-formed microemulsions and other in situ-formed fluids developed for and with high-density brines. High-density brines are defined as those having a density higher than 15 lb/gal independently up to about 21 lb/gal (higher than 1800 independently up to about 2500 kg/m$^3$), alternatively higher than 16 lb/gal independently up to about 19 lb/gal (2300 kg/m$^3$) or independently up to about 18.5 lb/gal (higher than 1900 independently up to about 2200 kg/m$^3$). Use of the term "independently" with respect to a range means that any lower threshold may be combined with any upper threshold to give an acceptable alternative range. The salts for these high-density brines may include formate salts (e.g. HCOOK, HCOONa, HCOOCe), chloride salts (e.g. NaCl, KCl, CaCl$_2$, ZnCl$_2$), bromide salts (e.g. NaBr, KBr, CaBr$_2$, ZnBr$_2$), acetate salts (e.g. cesium acetate, zinc acetate), nitrate salts, phosphate salts, citrate salts, tartrate salts, iodide salts, glutamate salts, diglutamate salts, nitriloacetate salts, and combinations thereof, with chloride salts (e.g. NaCl, KCl, CaCl$_2$, MgCl$_2$) optionally also present.

The hydrocarbons and synthetic oils removed from the subterranean formation include, but are not necessarily limited to, asphaltenes, oil-based muds, synthetic oil-based muds, emulsion-based muds, slugs, filter cakes of these materials, near-wellbore damage, and combinations of these materials. Slugs are extremely high viscous fluids formed under dynamic condition when crude oil or OBM contacts aqueous fluids that contains certain additives that could target emulsification and trapped solids.

The microemulsions and in situ-formed fluids described herein may be used for removing oil-based mud (OBM) or synthetic oil-based mud (SBM), reversing the wettability from oil-wet to water-wet and removing or minimizing formation damage in the subterranean reservoirs of oil or gas wells drilled with SBMs or OBMs, as well as OBM/SBM displacement to a water-based fluid, near-wellbore remediation, well stimulation, enhanced oil recovery (EOR), and flow-back recovery in shale gas wells.

In one non-limiting embodiment, the SPME may be pre-formed, and in another non-limiting embodiment, a different fluid may be formed in situ. The different in situ-formed fluid includes, but is not necessarily limited to, microemulsions, nanoemulsions, macroemulsions, miniemulsions, micellar dispersion, multiple emulsions, and combinations thereof. By the term "macroemulsions" is meant standard emulsions, or what is conventionally meant by the term "emulsions" as distinct from microemulsions, nanoemulsions, miniemulsions, micellar dispersion, and multiple emulsions. By the term "multiple emulsions" is meant a complex polydispersed system where both an oil-in-water and a water-in-oil emulsion exist simultaneously, which emulsions are stabilized by lipophilic and hydrophilic surfactants, respectively. Multiple emulsions include, but are not necessarily limited to, oil-in-water-in-oil emulsions and water-in-oil-in water emulsions.

The microemulsions may be single phase microemulsions (SPMEs) formed prior to pumping to the subterranean reservoir, or the SPMEs or other fluids (e.g. a microemulsions, nanoemulsions, macroemulsions, miniemulsions, micellar dispersion, multiple emulsions, and combinations thereof) may be formed in situ in the subterranean reservoir or an injected SPME could form a new fluid (e.g. a microemulsions, nanoemulsions, macroemulsions, miniemulsions, micellar dispersion, multiple emulsions, and combinations thereof) incorporating non-polar and polar fluids and particles already present in the formation. This improved clean up method using high-density brines occurs by solubilization of the hydrocarbons and synthetic oils and which is eventually non-polar material into the microemulsion or in situ-formed fluid when the treatment fluid contacts the hydrocarbons and synthetic oils. An in situ fluid may be formed when one or more surfactant and a polar phase (e.g. brine) contact the reservoir formation and solubilizes the hydrocarbons and synthetic oils encountered in the porous media. That is, by "eventually" it is meant herein that the non-polar material, linker and surfactant at some point later in time, such as downhole or separately added, contacts hydrocarbons and synthetic oils fluid, such as oil-based mud filter cake or even reservoir fluids, or a fluid of intermediate polarity, such as a separately added alcohol or co-surfactant. By "eventually" it is meant that the contact is not necessary or compulsory, but that such eventual contact may not be ruled out. For instance, in order to make a SPME or other fluid in situ it is not always necessary to add an alcohol co-surfactant, but in some instances (e.g. when employing ionic surfactants at low temperature) it is almost necessary or at least it makes the method easier to perform.

In the methods and compositions herein, the clean-up may be accomplished by changing the OBM and other non-polar materials into a single phase microemulsion, such as Winsor IV or similar phase behavior, or other in situ-formed fluid as will be described later in more detail. Single phase microemulsions may be defined as bi-continuous phases formed by oil and water. In one non-limiting explanation of the phenomenon, a single phase microemulsion contacts the oil-based mud and other non-polar materials and forms a water continuous (oil-in-water) microemulsion. It has been surprisingly discovered that this contacting may be accomplished without circulating the well, by which is meant pumping fluid through the whole active fluid system, including the borehole and all the surface tanks that constitute a primary system. That is, the fluid with the pre-formed SPME is pumped into the formation or subterranean reservoir and allowed to soak the non-polar materials present, with incorporation of the non-polar material or mixing taking place by diffusion. In other non-limiting embodiments, it may be helpful to circulate the fluid to remove surface damage before pumping the pre-formed SPME into the formation or subterranean reservoir. It has also been discovered that the microemulsion or other multiple phase fluid may be formed in situ downhole. That is, it is not necessary to form the microemulsion on the surface and pump it downhole. As noted, the literature generally describes these micro-emulsions as single phase microemulsions, referred to as the Winsor IV case of phase behavior, but the present method includes many different types of multiple phase systems, including but not necessarily limited to, the use of three-phase systems in which the microemulsion is in equilibrium with an excess of one or both the polar phase (high-density brine) and non-polar phase (oil), which is usually refereed to as the Winsor III case of phase behavior, and including at least one linker.

More specifically, the methods and compositions herein involve using an in situ-formed fluid such as a microemulsion, etc., for removing hydrocarbons and synthetic oils which include, but are not necessarily limited to, oil-based mud (OBM) or synthetic oil-based mud (SBM), and reversing the wettability and removing or minimizing formation damage in the subterranean reservoirs of oil or gas wells drilled with SBMs or OBMs. The in situ fluid (e.g. microemulsion, nanoemulsion, macroemulsion, miniemulsion, micellar dispersion or multiple emulsion etc.) may be formed when at least one surfactant and a polar phase (usually, but not limited to water or brine), and at least one linker, contacts the OBM or other non-polar materials and solubilizes the non-polar material of the OBM. It should be understood herein that the term OBM encompasses SBMs.

One of the benefits of the in situ fluid formation of the microemulsion, etc., is that the cleaning fluid does not require any additional oil or solvent in the formulation, or at least in a one non-limiting embodiment requires much less than the proportion that could be solubilized in the final microemulsion, which gives a higher capacity for oil or non-polar material incorporation or cleaning capability when contacted with the OBM and other non-polar materials. Another benefit is that any particles or other oil-wet contamination turn from oil-wet to water-wet. Additionally, water-wetting improves damage remediation (including, but not limited to, filter cake destruction) when mineral acids, organic acids, oxidizing agents, water-soluble enzymes (e.g. catalysts), or precursors of these components (e.g. in situ acid generators) are spotted into a subterranean reservoir after or during the wettability reversal process, because it favors the contact between the acid and the particles. As the OBM (or SBM) is contacted and absorbed and/or the oil-wet, non-polar materials are converted from oil-wet to water-wet during the in situ formation of a fluid, such as a microemulsion or nanoemulsion or precursors of them, the blend of surfactants and a polar phase (e.g. water) may also contain acids, barite dissolvers (chelants) or other precursor additives that can dissolve the acid-soluble particles or dissolve the barite and other particulates and also break down any polymeric fluid loss additive (if present). In many cases, the surfactant may be a surfactant blend and is often a surfactant and co-surfactant mixture, in which the co-surfactant is a short amphiphilic substance such as an alcohol (in non-limiting examples, propanol, butanol, pentanol in their different isomerization structures) as well as glycols, and ethoxylated and propoxylated alcohols or phenols. Alcohols are also noted herein as substances of intermediate polarity; that is, intermediate between non-polar substances such as oils and polar substances such as water. These materials are different from the at least one linker that is included in the SPME.

In one non-limiting embodiment, the in situ-formed fluids, in a non-limiting version microemulsions, may be made using a surfactant, at least one linker, a polar fluid and a relatively small amount of non-polar fluid and/or fluid of intermediate polarity. It has been found that it is sometimes helpful when forming an in situ microemulsion downhole to inject a water solution of surfactant already containing some solubilized oil (in a non-restrictive example only from about 2 to about 40 wt % or so). In other words, the injected fluid may be considered as a single phase microemulsion containing only 2 wt % of oil, and then once in the reservoir this fluid will solubilize the oil which is in situ and thus becomes another single phase microemulsion containing much more oil, in a non-limiting instance, about 70 or 80 wt %.

The use of this in situ fluid (e.g. single phase microemulsion, nano-emulsion, micellar dispersion, etc.) chemistry in reservoir cleaning optionally allows the direct contact of a chelating agent, such as an acid and/or an acid blend mixed in conventional brine completion fluids (or generated in situ), without causing a high viscosity oil continuous emulsion (sludge) and consequent formation blockage. The action of the single phase microemulsion, e.g., alters the non-polar materials present, which allows a chelating agent (if present) such as an acid or a salt of an acid, such as a polyamino carboxylic acid (PACA) or polylactic acid and/or a mineral acid or salt thereof, e.g. hydrochloric acid or an organic acid or salt thereof, e.g. acetic acid, or other acid, to solubilize the formation and/or particles that may be present, such as calcium carbonate, hematite, ilmenite, and barite. Particles composed of magnesium tetroxide (in one non-limiting embodiment) may be treated with an in situ fluid (e.g. a single phase microemulsion, containing an acid or acid blend) providing the acid is an organic acid in one non-limiting embodiment. It has been found that PACAs perform relatively better in an alkaline environment as the salt of these acids, which further differentiates them from the more common acids and salts thereof.

For instance a salt of PACA dissociates barium sulfate from the calcium carbonate treated; the PACA takes on the cation. In a non-limiting example, a Na or K salt of PACA when contacting calcium carbonate contacts and dissolves the barium salt through cation exchange. The salt forms of PACAs perform relatively better than the plain acid form, but the undissociated acid form still performs the functions and achieves the desired results of the methods and compositions herein. The plain acid form works somewhat better at relatively low pH.

The net effect of such a treatment system will improve an operator's chance of injecting water in a reservoir to maintain reservoir pressure (for example, for injection wells), and improve production rates in producing wells. In either case, non-polar material alteration is accomplished by creating the in-situ fluid (e.g. single phase microemulsion) across the injection/production interval or pumping the pre-formed SPME into the formation.

In brief, one non-limiting embodiment OBM material clean up technology herein, also referred to as "one-step" clean up, utilizes preformed SPMEs and/or in situ single phase microemulsion, e.g., and optional chelating agent and/or acid techniques in a single blend to incorporate the oil and/or polar components of invert emulsion of an OBM or other non-polar materials into a microemulsion (or in other in situ-formed fluid) and simultaneously decompose its acid soluble components. Altering the hydrocarbons and synthetic oils using a preformed SPME or an in situ-formed fluid facilitates the elimination of these hydro-carbons and synthetic oils, which may include oil-wet solids, as solubilized in the aqueous solution component of the in situ-formed fluid thus preventing the occurrence of a sludge that could form.

It will be appreciated that it is not necessary for all of the hydrocarbons and synthetic oils and all of the oil-wet contaminant particles, etc., to be removed from a subterranean reservoir for the method and its compositions herein to be considered successful. Success is obtained if more hydrocarbons and synthetic oils and/or more particles, etc., are removed using the microemulsions, miniemulsions, nanoemulsions, micellar dispersions, etc., herein, whether not formed in situ (e.g. single phase microemulsion, etc.) than if it is not used, or if more hydrocarbons and synthetic oils and/or particles, etc., are removed using the microemulsions together with a chelating agent, as compared to the case where no microemulsions and/or chelating agents are used. Alternatively, the methods and compositions are considered successful if at least a portion of the hydrocarbons and synthetic oils are removed. In one non-limiting embodiment at least a majority (>50%) of the hydrocarbons and synthetic oils are removed. In general, of course, it is desirable to remove as much of the OBM, non-polar materials, contaminants, hydrocarbons and synthetic oils, and other particulates as possible. One non-restrictive goal of the methods and compositions herein is to remove non-polar material and oil-wet particles to obtain a high percentage of water injection (in a non-limiting instance, >50% increase in the injection rate) or higher percentage of oil and gas production (e.g. >50%) as compared to the expected production in the case where no microemulsion is used whatsoever.

The subterranean reservoir clean up technology described herein has a wide range of applications. By combining the chemical aspect of wellbore clean up with displacement techniques, it is believed that subterranean reservoir disadvantages after drill-in with OBMs (e.g. invert emulsion fluids) may be significantly reduced or eliminated. Applications include, but are not necessarily limited to, oil-based drilling fluid displacement to water-based fluid, near-wellbore remediation, well stimulation, enhanced oil recovery (EOR), flow-back recovery in shale gas wells, cement spacers, and similar applications.

More specifically, drilling a well with WBMs may also cause formation damage. For instance, the formation damage caused by WBM includes, but is not necessarily limited to, in-situ water or brine-in-crude oil emulsions, and solids invasion. The water and/or the particles may tend to decrease the pore volume and effective permeability of the formation, and the water may additionally swell certain clay minerals that may be present.

The methods and compositions herein may be used to remove, heal, and/or remediate damage caused by deposits of macromolecules from crude oils, such as the case of deposition of asphaltenes in the reservoir porous media. Other damage that may be removed includes any emulsions that incorporate or include any non-polar material (oil and other hydrocarbons) from the reservoir, or introduced in the drilling mud, as well as other substances injected downhole.

Thus, the methods and compositions herein have the advantages of reduced formation damage, and consequently increased hydrocarbon recovery, and/or increased water injection rate, as compared with an otherwise identical method and composition without microemulsions (in situ or otherwise), e.g. single phase microemulsions and/or the single phase microemulsion or in situ-formed fluid including an acid or other component. Microemulsions are thermodynamically stable, macroscopically homogeneous mixtures of at least three components: a polar phase and a nonpolar phase (usually, but not limited to, water and organic phase) and at least one surfactant, often more than one surfactant, for instance with a co-surfactant such as an alcohol, particularly when ionic surfactants are used, as mentioned in the reference: J. L. Salager and R. E. Anton, "Ionic Microemulsions", Chapter 8, in P. Kumar and K. L. Mittal, ed. *Handbook of Microemulsion Science and Technology*, Marcel Dekker Inc. New York 1999, pp. 247-280. Suitable co-surfactants include, but are not necessarily limited to, mono or poly-alcohols, low molecular weight organic acids or amines, polyethylene glycol, low ethoxylation solvents such as butoxyethanol and the like, and mixtures thereof. Microemulsions form spontaneously and differ markedly from the thermodynamically unstable macroemulsions, which depend upon intense mixing energy for their formation. Microemulsions are well known in the art, and attention is respectfully directed to S. Ezrahi, A. Aserin and N. Gat, "Chapter 7: Aggregation Behavior in One-Phase (Winsor IV) Microemulsion Systems", in P. Kumar and K. L. Mittal, ed., *Handbook of Microemulsion Science and Technology*, Marcel Dekker, Inc., New-York, 1999, pp. 185-246.

The referenced chapters describe the types of microemulsion phase behavior defined by Winsor: Winsor I, Winsor II and Winsor III. A system or formulation is defined as: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil. The author also describes Winsor IV as a single-phase microemulsion, with no excess oil or excess water. Although not wishing to be limited by any one theory, it is believed that the microemulsions formed in the methods and compositions herein are of the Winsor IV type, which means the entire system is a microemulsion phase at least at first and somewhere in the process, with the possibility of ending with one or two excess phases as the injected formulation is diluted by the reservoir fluids. That is, the original single phase microemulsion, a Winsor I or II may expel some excess phase and become a Winsor III system with the same microemulsion and properties. The thermodynamically stable single phase Winsor IV microemulsion could evolve by a change in formulation or composition into the formation of a miniemulsion or nanoemulsion, which is a two-phase system either Winsor I or Winsor II with submicron size droplets which could be stable for a long period of time, but not permanently stable as a microemulsion, as explained in reference J. L. Salager, "Emulsion Phase Inversion Phenomena" in *Emulsions and Emulsion Stability*, J. Sjoblom Ed., 2$^{nd}$ Edition, Chap. 4, pp. 185-226, Taylor and Francis, London (2006).

In one non-limiting embodiment, the microemulsions and SPMEs described herein may be Winsor III or Winsor IV.

Surfactants suitable for creating the in situ fluids (e.g. single phase microemulsions) herein include, but are not necessarily limited to nonionic, anionic, cationic and amphoteric surfactants and in particular, blends thereof. Co-solvents or co-surfactants such as alcohols are optional additives used in the microemulsion formulation. Suitable nonionic surfactants include, but are not necessarily limited to, alkyl polyglycosides, sorbitan esters, polyglycol esters, methyl glucoside esters, or alcohol ethoxylates. Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, alkyl ether carboxylates, alkyl linear or branched carboxylates, linear and branched ether sulfates, alkylenediamides, and mixtures thereof. Suitable cationic surfactants include, but are not necessarily limited to, arginine methyl esters, and alkanolamines. In one non-limiting embodiment at least one surfactant or alternatively at least two surfactants in a blend may be used to create single phase microemulsions in situ, as well as the other in-situ fluids. Suitable surfactants may also include so-called extended surfactants containing a nonionic spacer-arm central extension and an ionic or nonionic polar group. The nonionic spacer-arm central extension may be the result of polypropoxylation, polyethoxylation, or a mixture of the two, in non-limiting embodiments.

In another non-restrictive embodiment, mesophase surfactant solution and/or the micellar solution, the SPME and various in situ-formed fluid formulations (e.g. macroemulsion, nanoemulsion, micellar dispersion, etc.) may contain a co-surfactant which may be an alcohol having from about 3 independently to about 10 carbon atoms, in another non-limiting embodiment from about 4 independently to about 6 carbon atoms. In another non-limiting embodiment, the mesophase surfactant solution and/or the micellar solution, the SPME and various in situ-formed fluid formulations may optionally include a co-solvent, which is sometimes used interchangeably with "co-surfactant".

A specific example of a suitable co-surfactant includes, but is not necessarily limited to butanol. These co-surfactants may be alkoxylated, e.g. ethoxylated and/or propoxylated, although in most cases sufficient ethoxylation should be present to accomplish the purposes of the methods herein. In one non-restrictive embodiment the number of ethoxy units ranges from about 3 independently to about 15, alternatively from about 6 independently up to about 10.

In one non-restrictive version, an optional co-surfactant may be employed. The proportion of co-surfactant to be used with the surfactant is difficult to specify in advance and may be influenced by a number of interrelated factors including, but not necessarily limited to, the nature of the surfactant, the nature of the co-surfactant, the type of drilling fluid being removed, displaced or otherwise affected, wellbore conditions, and the like. In one non-limiting embodiment, a fluid to be pumped includes a surfactant blend of polyethoxylated alkyl sulfate and polyglycerol ester (such as PG 8-10 ester available from Oleon N.V.) that has a molar ratio of free OH/esterified OH of 3.4/1, optionally with an alkyl alcohol ethoxylated with 7.5 or higher EO.

It has been discovered that the mesophase surfactant solutions and/or the micellar solutions, the pre-formed SPMEs or in situ-formed fluids described herein may incorporate a high-density brine if at least one linker is used in addition to the at least one surfactant. By definition, the linker is different from the surfactant or a co-surfactant. A linker molecule is a lipophilic or hydrophilic molecule that helps to increase the solubilization and modify the interfacial properties of a brine-oil-surfactant microemulsion system. The linker molecules segregate near the interface of the hydrophobic chain in the case of the lipophilic linker. The linker molecules segregate near the interface of the hydrophilic head of the surfactant in the case of the hydrophilic linker. The linker molecule produces an increase of interaction between surfactant molecules and generates a more flexible surfactant membrane, which results in higher oil solubilization and better oil removal. In general, the linkers extend the stability of the microemulsion or other emulsions systems to temperature increase, salts concentration increase and contaminant with any type of oil and aqueous system.

Suitable linkers include, but are not necessarily limited to, amines, carboxylic acids, dicarboxylic acids saturated and unsaturated fatty acids, alcohols with more than 8 carbon atoms, glycols, polyols, phenols, toluene sulfonate, small concentration of organic acids and combinations thereof. By "small" concentrations of organic acids is meant from about 0.1 vol % independently to about 10 vol %; alternatively from about 0.5 vol % independently to about 3.0 vol %. Non-limiting examples of suitable specific linkers include, but are not necessarily limited to, naphthalene sulfonic acid, glutamic acid, octyl phenol, octanol, and the like. Typically the linker concentration used in these systems may range from about 0.1 vol % independently to about 5 vol %; alternatively from about 0.5 vol % independently to about 3 vol %.

It has also been discovered that one of the benefits of the new fluid formulations (mesophase surfactant solutions, micellar solutions, pre-formed microemulsions and in situ-formed multiple phase fluids) is that they have ultra-high salt tolerance, which is determined by having a single-phase fluid without salt or surfactant precipitation and good cleaning capability when contacted with the drilling fluid filter cake and/or near-wellbore damage materials. This absence of salt precipitation is a type of stability; no salt precipitation or phase separation of the single phase fluid was observed.

In one non-limiting embodiment herein, the mesophase surfactant solutions and/or the micellar solutions, the SPME or in situ-formed fluids contain a non-polar liquid, which may include a synthetic fluid including, but not necessarily limited to, ester fluids; paraffins (such as PARA-TEQ™ fluids from Baker Hughes Drilling Fluids) and isomerized olefins (such as ISO-TEQ™ from Baker Hughes Drilling Fluids). However, diesel and mineral oils such as ESCAID 110 (from Exxon) or ECD 99-DW oils (from TOTAL) can also be used as a non-polar liquid in preparing the fluid systems of herein. Other suitable non-polar liquids include, but are not necessarily limited to, limonene, pinene and other terpenes, xylene, mutual solvents, and the like. As noted previously, an advantage of forming the active formula (e.g. nanoemulsion, single phase microemulsion, etc.) in situ is that less non-polar liquid needs to be used (as compared with a pre-formed microemulsion) since all or most of the non-polar liquid is found in the non-polar materials, OBM (or SBM) itself. This gives a higher capacity for the microemulsion, micelle dispersion, SPME, e.g., to solubilize the oil and other substances of the non-polar materials.

It will be appreciated that the amount of in situ fluid to be created or formed and the amounts of in situ-forming components (polar, nonpolar and a surfactant and co-surfactant, if present) to be added or included are difficult to determine and predict in advance or in general with much accuracy since it is dependent upon a number of interrelated factors including, but not necessarily limited to, the high-density brine type, the OBM or SBM type, the temperature of the formation, the particular surfactant or surfactant blend used, whether a chelating agent or acid is present and what type, etc. Nevertheless, in order to give some idea of the quantities used, in one non-limiting embodiment, the proportion of non-brine components in the in situ fluid (e.g. single phase microemulsion, macroemulsion, miniemulsion, etc.) may range from about 15 independently to about 85 volume %, even about 90 volume %, and in other non-limiting embodiments may range from about 1 independently to about 20 volume % in a diluted microemulsion, sometimes called micellar solutions, and from about 70 independently to about 95 volume % in another diluted microemulsion, sometimes called an inverse micellar solution.

It is expected that high-density brine will be a common component of the in situ fluid (e.g. single phase microemulsion, nanoemulsion, micelle dispersion, etc.), and any of the commonly used brines, and salts to make them, are expected to be suitable in the compositions and methods herein. Although water is expected to be the polar liquid used to make the microemulsions in situ, it will be appreciated that other polar liquids such as alcohols and glycols, alone or together with water, may be used. Again, high-density brines are defined as those having a density higher than about 15 lb/gal independently up to about 19 lb/gal (higher than about 1800 independently up to about 2300 kg/m$^3$), alternatively higher than about 16 lb/gal independently up to about 18.5 lb/gal (higher than about 1900 independently up to about 2200 kg/m$^3$). The salts for these high-density brines may include formate salts (e.g. HCOOK, HCOONa, HCOOCe), chloride salts (e.g. NaCl, KCl, CaCl$_2$, ZnCl$_2$), bromide salts (e.g. NaBr, KBr, CaBr$_2$, ZnBr$_2$), acetate salts (e.g. cesium acetate, zinc acetate, magnesium acetate) and combinations thereof, with chloride salts (e.g. NaCl, KCl, CaCl$_2$, MgCl$_2$) optionally also present In the non-limiting embodiment where the in situ fluid (e.g. single phase microemulsion, nanoemulsion, macroemulsion, etc.) contains at least one chelating agent, the chelating agent should be capable of solubilizing or dissolving at least some of the particulate materials present. The chelating agent may be one or more inorganic acids or salts thereof including, but not necessarily limited to, hydrochloric acid, sulfuric acid, and/or organic acids including, but not necessarily limited to, an organic agent or salt thereof, e.g. acetic acid, formic acid and mixtures thereof. In one non-limiting embodiment, the acid may be only one mineral acid or only one organic acid.

In many embodiments, the mesophase surfactant solution and/or the micellar solution, the pre-formed SPME and/or the in situ-formed fluid may contain at some point a chelating agent such as polylactic acid and/or a polyamino carboxylic acid (PACA) of the acrylic or maleic type, or carboxylated polysaccharides, or a salt of PACA. Suitable PACAs and other chelating agents include, but are not necessarily limited to, nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxyethyl-ethylenediamine triacetic acid (HEDTA), triethylenetetramine hexaacetic acid (TTNA), trans-1,2-diaminocyclohexane tetraacetic acid (DCTA), tripolyphosphates, polyphosphates, pyrophosphates, alphaether carboxylates, oxy-diacetate salts, carboxymethyl tartronate (CMT) and carboxymethyl oxy-succinate (CMOS), citric, tartaric and tartronic salts and mixtures thereof.

The concentration of chelating agent in the mesophase surfactant solution and/or the micellar solution, the in situ-formed fluid (e.g. nanoemulsion, single phase microemulsion, multiple emulsion, etc.) has a lower limit of about 1 volume %, alternatively of about 5 volume %, and an upper limit of about 30 volume %, alternatively about 20 volume %, and in another non-restrictive embodiment up to about 15 volume %.

There are various ways by which the chelating agent may be delivered according to the procedure herein. The chelating agent may be added to the pumped fluid with the components to form the single phase microemulsion and/or in situ-formed fluid, e.g., in situ; or may be added before (as a presoak) or after the in situ-formed fluid (e.g. single phase microemulsion, miniemulsion, micelle dispersion, etc.) treatment; or may be added to the microemulsion soak solution once it is formed in place before removing the majority of the non-polar materials and OBM (e.g. invert emulsion) and combinations thereof.

With further specificity, the methods and compositions herein may concern one-trip clean up fluids designed to physically change an OBM (e.g. an invert emulsion) and other non-polar materials and optionally acidify the acid soluble components present. The method not only physically changes the nature of the non-polar materials, asphaltenes, the resulting oil components, etc., which are incorporated into the single phase microemulsion or in situ-formed fluid and then further micro-emulsified or solubilized, allow for ease of water injection, in the case of injection wells, or ease of production through completion screens, in the case of production wells. With the conversion of the external oil to internal emulsified oil in water, plus the optional decomposition of minerals (e.g. particles e.g. calcium carbonate and other acid-soluble components) by chelating agents, most of the non-polar fluid and particulate material is either removed or micro-sized to the extent that only a minimal or reduced amount of damaging components remain in the subterranean reservoir.

In one non-limiting embodiment and in still further detail, the compositions and methods herein utilizes mesophase surfactant solutions, micellar solutions, a microemulsion or other in situ-formed fluid to convert an OBM and oil-wet particles to a water-based fluid and water-wet particles. The benefits of such conversions, often called inversion, are several. Non-polar materials are oil wet and pose compatibility problems for certain completion operations, such as water injection and gravel packing, whereas water-based or water-wet components are naturally compatible with injection water and brine-based gravel pack carrier fluids. Additionally, WBMs and water-wet particles are ideal for damage remediation of the subterranean reservoir when mineral acids, organic acids, oxidizing agents, water soluble enzymes (catalysts) and in situ acid generators are spotted in a wellbore after (or during) the treatment.

The in situ-formed fluid (e.g. microemulsion, miniemulsion, etc.) soak solution may also contain acids, barite dissolvers (chelants) or other precursor additives that can dissolve the acid-soluble particles or dissolve the barite and break down fluid loss additives (polymeric or otherwise). The value of such a conversion using a single soak solution with all its functional components is that the OBM (e.g. invert emulsion) and other non-polar materials may be converted to water-based or water-continuous materials containing dissolvable particulates and fluid loss control additives that may be removed in a single operational step.

The in situ-formed fluid (e.g. nanoemulsion, single phase microemulsion, micelle dispersion, etc.) treatment may be composed of different brine and oil blends, depending on the required density of the fluid for the well.

This technology does not require or discriminate against any invert emulsion. In other words, the single phase microemulsion or in situ-formed fluid may be applied to reservoir clean up for any OBM system regardless of base oil type or emulsifier used to formulate the mud. This versatility allows an operator flexibility to formulate the drilling fluid based on wellbore needs. This is not the case in some prior methods whereby highly specific amine emulsifiers are needed because they require acid protonation to reverse the wettability. In the technology herein, the chelating agent is only used for removal of acid soluble bridging components. In one non-limiting embodiment the methods and compositions are practiced in the absence of amine emulsifiers, such as rosin amines and/or amine emulsifiers of the formula $R-N-[(CH_2CH_2R'A)_xH]_2$.

Another important feature relative to other OBM, invert emulsion or other non-polar material removal methods is that the oil phase of the OBM emulsion is micro-emulsified into the single phase microemulsion and other incorporating fluids by soaking, that is simple contacting, letting the diffusion produce the mixing over a time span ranging from a few minutes to a few days. The treatment process reduces the energy necessary for the microemulsion or other incorporating fluid to form when compared to previous methods. This efficiency eliminates or reduces the number of pipe trips and decreases the time required to complete the well.

The invention will now be further discussed with respect to actual implementation of the invention in Examples which are not intended to limit the invention, but simply to further illustrate it. Again, while the in situ-formed fluid may be referred to as a "microemulsion" or "single phase microemulsion", it should be appreciated that the methods and compositions are expected to apply to other in situ fluids including, but not limited to mesophase surfactant solutions, micellar solutions, miniemulsions, nanoemulsions, macroemulsions, micellar dispersions, multiple emulsions, and all types of microemulsions, as described herein.

EXAMPLES

Example 1

Figure 1:
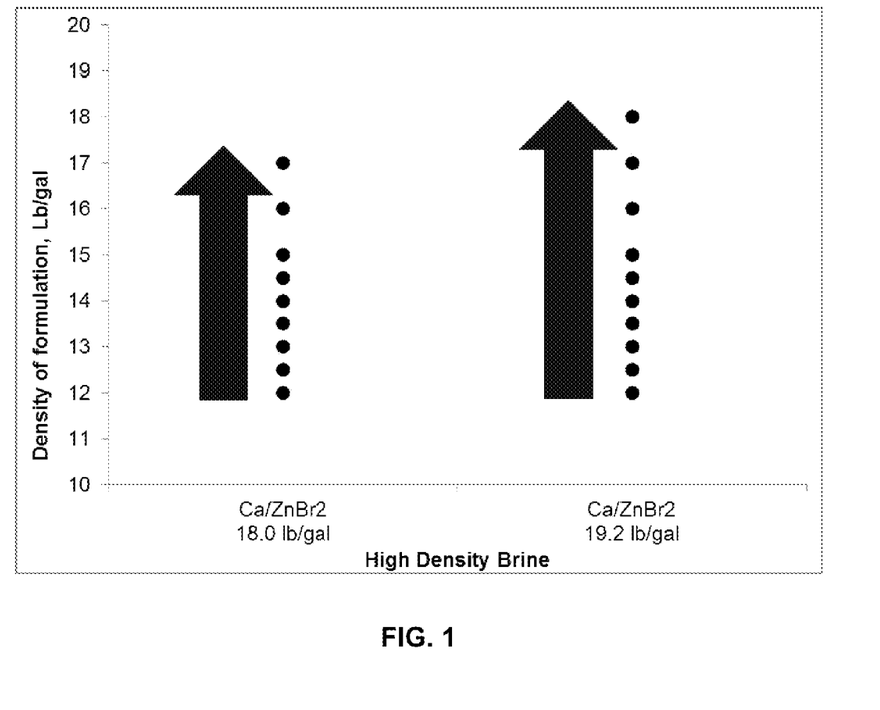
FIG. 1 is a bar graph of a series of formulations for Ca/ZnBr$_2$ brines beginning in a conventional density range moving to a high density range.

FIG. 1 presents a bar graph of a series of fluid formulations for Ca/ZnBr$_2$ brines beginning in a conventional density range moving from 12.0 lb/gal (1.4 kg/liter) to 18.0 lb/gal (2.2 kg/liter) for the formulation on the left and from 12.0 lb/gal (1.4 kg/liter) up to 19.2 lb/gal (2.3 kg/liter) for the formulation on the right. Each dot represents a fluid formulation. For this specific example, the formulations are comprised by 10 vol % of organic acid, 20 vol % of surfactant package, 64 vol % of brine, 1 vol % of linkers, and 5 vol % of co-surfactant. All the fluid formulations demonstrated very good stability and cleaning capability.

Example 2

Figure 2A:
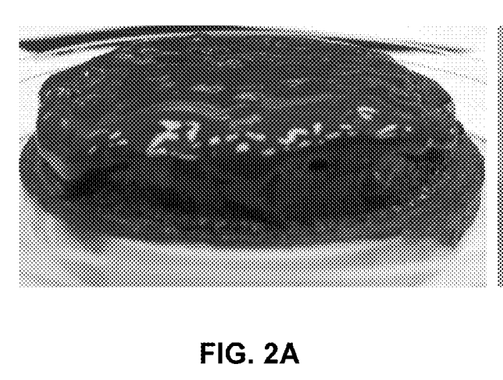
FIG. 2A is a photograph of an OBM filter cake before treatment.
Figure 2B:
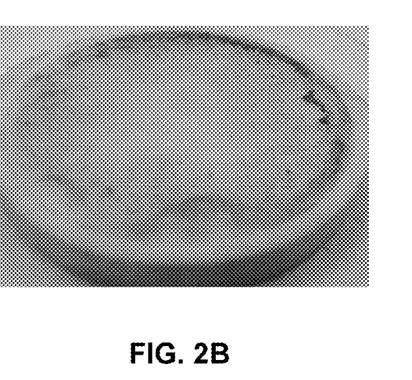
FIG. 2B is a photograph of the OBM filter cake of FIG. 2A after treatment with one of the high density brines at 200° F. (93° C.).

FIG. 2A is a photograph of an OBM filter cake before treatment and FIG. 2B is a photograph of the same OBM filter cake of FIG. 2A after treatment with one of the high density brines at 200° F. (93° C.). This is an example of the filter cake removal test using one of the formulations. The composition of the formulation used is 10 vol % of organic acid, 20 vol % of surfactant package, 64 vol % of brine, 1 vol % of linkers, and 5 vol % of co-surfactant. Enough Ca/ZnBr$_2$ brine was added to reach the desire density.

In the foregoing specification, the invention has been described with reference to specific embodiments thereof, and has been suggested as effective in providing effective methods and compositions for removing hydrocarbons and synthetic oils, asphaltenes, non-polar materials, etc., from subterranean reservoirs and formations. However, it will be evident that various modifications and changes may be made thereto without departing from the broader scope of the invention as set forth in the appended claims. Accordingly, the specification is to be regarded in an illustrative rather than a restrictive sense. For example, specific combinations of mesophase surfactant solutions, micellar solutions, single phase microemulsion-forming components and other components for forming the in situ fluids, such as surfactants, linkers, high-density brines, co-surfactants, chelating agents, acids, solvents, non-polar liquids, etc. and proportions thereof falling within the claimed parameters, but not specifically identified or tried in a particular composition to improve the removal of non-polar materials herein, are anticipated to be within the scope of this invention.

The words "comprising" and "comprises" as used throughout the claims are to interpreted "including but not limited to".

The present invention may suitably comprise, consist or consist essentially of the elements disclosed and may be practiced in the absence of an element not disclosed. For instance, in one non-limiting embodiment there may be provided a method of removing at least a portion of hydrocarbons and synthetic oils from a subterranean location containing hydrocarbons and synthetic oils, where the method consists essentially of or consists of introducing a fluid formulation to the subterranean location to contact the fluid formulation with the non-polar material present at the subterranean location, where the fluid formulation comprises, consists essentially of, or consists of a set of components selected from the group consisting of (1) a mesophase surfactant solution and/or micellar solution which comprises at least one surfactant and a high-density brine comprising a salt, (2) a single-phase microemulsion (SPME) or (3) in situ fluid-forming components. The mesophase surfactant solution and/or the micellar solution may also optionally comprise at least one co-surfactant or co-solvent, optionally at least one linker, and optionally at least one acid or acid precursor. The SPME may comprise, consist essentially of, or consist of at least one surfactant, at least one non-polar fluid, optionally at least one linker, optionally at least one co-surfactant or co-solvent, optionally at least one acid or acid precursor, and a high-density brine comprising a salt. The in situ fluid-forming components may comprise, consist essentially of, or consist of at least one surfactant, optionally at least one linker, optionally at least one co-surfactant or co-solvent, optionally at least one acid or acid precursor, and a high-density brine comprising a salt. The method further consists essentially of or consists of incorporating at least part of the hydrocarbons and synthetic oils into an incorporating fluid selected from the group consisting of (1) the mesophase surfactant solution and/or the micellar solution, (2) the SPME, and (3) a different fluid formed in situ at the subterranean location, where in the latter case the method further comprises forming the different in situ fluid from the in situ fluid-forming components, and removing the SPME or the different in situ-formed fluid incorporating the non-polar material from the subterranean location. The different in situ-formed fluid is selected from the group consisting of microemulsions, nanoemulsions, macroemulsions, miniemulsions, micellar dispersion, multiple emulsions, and combinations thereof. The at least one linker is selected from the group consisting of amines, carboxylic acids, dicarboxylic acids, saturated and unsaturated fatty acids, alcohols with more than 8 carbon atoms, glycols, polyols, phenols, toluene sulfonate, and combinations thereof. The high-density brine has a density higher than about 15 lb/gal up to about 21 lb/gal (higher than about 1800 up to about 2500 kg/m$^3$).

What is claimed is:

1. A method of removing at least a portion of hydrocarbons or synthetic oils from a subterranean location containing hydrocarbons and synthetic oils, the method comprising:
   introducing a fluid formulation to the subterranean location to contact the fluid formulation with the hydrocarbons and synthetic oils present at the subterranean location, where the fluid formulation consists of:
   A) a set of components selected from the group consisting of:
   (1) a mesophase surfactant solution or micellar solution, which comprises:
      at least one surfactant; and
      a high-density brine comprising a salt;
   (2) a single-phase microemulsion (SPME), which comprises:
      at least one surfactant;
      at least one non-polar fluid; and
      a high-density brine comprising a salt; and
   (3) in situ fluid-forming components comprising:
      at least one surfactant;
      a high-density brine comprising a salt;
   B) a fluid selected from the group consisting of a non-polar fluid, a fluid of intermediate polarity, and combinations thereof; and
   C) a component selected from the group consisting of at least one linker, an acid or components for forming an acid in situ in the subterranean location, a co-surfactant, and combinations thereof;
   incorporating at least part of the hydrocarbons and synthetic oils into an incorporating fluid formulation selected from the set of components consisting of (1) the mesophase surfactant solution or the micellar solution, (2) the SPME, and (3) a different fluid formed in situ at the subterranean location, where the different fluid in (3) is formed in situ from the in situ fluid-forming components and is selected from the group consisting of microemulsions, nanoemulsions, macroemulsions, miniemulsions, swollen micellar dispersion, multiple emulsions, and combinations thereof; and
   removing the incorporating fluid incorporating the hydrocarbons and synthetic oils from the subterranean location;
   where the high-density brine in the selected set of components has a density higher than 16 lb/gal up to about 21 lb/gal, and
   where the at least one surfactant of the selected set of components is selected from the group consisting of:
   nonionic surfactants selected from the group consisting of alkyl polyglycosides, sorbitan esters, methyl glucoside esters, polyglycol esters, and alcohol ethoxylates;
   anionic surfactants selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl disulfonates, alkylaryl disulfonates, alkyl disulfates, alkyl sulphosuccinates, alkyl ether sulfates, alkyl ether carboxylates, alkyl linear carboxylates, alkyl branched carboxylates, linear ether sulfates, branched ether sulfates, and alkylenediamides; and
   cationic surfactants selected from the group consisting of arginine methyl esters and alkanolamines; and mixtures thereof.

2. The method of claim 1 where the component is the at least one linker, and wherein the at least one linker is selected from the group consisting of amines, carboxylic acids, dicarboxylic acids, saturated and unsaturated fatty acids, alcohols with more than 8 carbon atoms, glycols, polyols, phenols, toluene sulfonate, and combinations thereof, and the at least one linker is different from the at least one surfactant of the selected set of components.

3. The method of claim 2 where the incorporating fluid is a thermodynamically stable, macroscopically homogeneous mixture of at least four components, where the four components are: a polar phase from a polar fluid, a non-polar phase from the hydrocarbons and synthetic oils, the at least one linker, and the at least one surfactant of the selected set of components.

4. The method of claim 2 where the concentration of the at least one linker ranges from about 0.1 vol % to about 5 vol %.

5. The method of claim 1 where the subterranean location is selected from the group consisting of a wellbore, a near-wellbore region of a subterranean formation, a subterranean formation, and combinations thereof.

6. The method of claim 1 where the component is the co-surfactant, and wherein the co-surfactant is a surface active substance selected from the group consisting of mono or poly-alcohols, low molecular weight organic acids or amines, polyethylene glycol, low ethoxylation solvents and mixtures thereof.

7. The method of claim 1 where the salt in the high-density brine of the selected set of components is selected from formate salts, chloride salts, bromide salts, acetate salts, nitrate salts, phosphate salts, citrate salts, tartrate salts, iodide salts, glutamate salts, diglutamate salts, nitriloacetate salts, and combinations thereof.

8. A method of removing at least a portion of hydrocarbons and synthetic oils from a subterranean location containing hydrocarbons and synthetic oils, the method comprising:
   introducing a fluid formulation to the subterranean location to contact the fluid formulation with the hydrocarbons and synthetic oils present at the subterranean location, where the fluid formulation consists of:
   A) a set of components selected from the group consisting of:
   (1) a mesophase surfactant solution or micellar solution, which comprises:
      at least one surfactant;
      at least one linker; and
      a high-density brine comprising a salt;

(2) a single-phase microemulsion (SPME), which comprises:
at least one surfactant;
at least one non-polar fluid;
at least one linker;
a co-surfactant or co-solvent; and
a high-density brine comprising a salt; and
(3) in situ fluid-forming components comprising:
at least one surfactant;
at least one linker;
a co-surfactant or co-solvent;
a high-density brine comprising a salt;
B) a fluid selected from the group consisting of a non-polar fluid, a fluid of intermediate polarity, and combinations thereof; and
C) a component selected from the group consisting of an acid or components for forming an acid in situ in the subterranean location, a co-surfactant, and combinations thereof;
incorporating at least part of the hydrocarbons and synthetic oils into an incorporating fluid formulation selected from the set of components consisting of (1) the mesophase surfactant solution or the micellar solution, (2) the SPME, and (3) a different fluid formed in situ at the subterranean location, where the different fluid in (3) is formed in situ from the in situ fluid-forming components and is selected from the group consisting of microemulsions, nanoemulsions, macroemulsions, miniemulsions, swollen micellar dispersion, multiple emulsions, and combinations thereof; and
removing the incorporating fluid incorporating the hydrocarbons and synthetic oils from the subterranean location;
where the at least one linker of the selected set of components is selected from the group consisting of amines, carboxylic acids, dicarboxylic acids, saturated and unsaturated fatty acids, alcohols with more than 8 carbon atoms, glycols, polyols, phenols, toluene sulfonate, and combinations thereof, and the at least one linker of the selected set of components is different from the at least one surfactant of the selected set of components; and
where the high-density brine of the selected set of components has a density higher than 16 lb/gal up to about 21 lb/gal;
where the salt of the selected set of components is selected from formate salts, chloride salts, bromide salts, acetate salts, nitrate salts, phosphate salts, citrate salts, tartrate salts, iodide salts, glutamate salts, diglutamate salts, nitriloacetate salts, and combinations thereof; and
where the at least one surfactant of the selected set of components is selected from the group consisting of:
nonionic surfactants selected from the group consisting of alkyl polyglycosides, sorbitan esters, methyl glucoside esters, polyglycol esters, and alcohol ethoxylates;
anionic surfactants selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl disulfonates, alkylaryl disulfonates, alkyl disulfates, alkyl sulphosuccinates, alkyl ether sulfates, alkyl ether carboxylates, alkyl linear carboxylates, alkyl branched carboxylates, linear ether sulfates, branched ether sulfates, and alkylenediamides; and
cationic surfactants selected from the group consisting of arginine methyl esters and alkanolamines; and mixtures thereof.

9. The method of claim 8 where the incorporating fluid is a thermodynamically stable, macroscopically homogeneous mixture of at least four components, where the four components are: a polar phase from a polar fluid, a non-polar phase from the hydrocarbons and synthetic oils, the at least one linker of the selected set of components, and the at least one surfactant of the selected set of components.

10. The method of claim 8 where the set of components is selected from the group consisting of (2) the SPME or (3) and where (2) or (3) comprise a co-surfactant that is a surface active substance selected from the group consisting of mono or poly-alcohols, low molecular weight organic acids or amines, polyethylene glycol, low ethoxylation solvents and mixtures thereof.

11. A method of removing at least a portion of hydrocarbons and synthetic oils from a subterranean location containing hydrocarbons and synthetic oils, the method comprising:
introducing a fluid formulation to the subterranean location to contact the fluid formulation with the hydrocarbons and synthetic oils present at the subterranean location, where the fluid formulation consists of:
A) a set of components selected from the group consisting of:
(1) a mesophase surfactant solution or micellar solution, which comprises:
at least one surfactant;
at least one linker; and
a high-density brine comprising a salt;
(2) a single-phase microemulsion (SPME), which comprises:
at least one surfactant;
at least one non-polar fluid;
at least one linker; and
a high-density brine comprising a salt; and
(3) in situ fluid-forming components comprising:
at least one surfactant;
at least one linker; and
a high-density brine comprising a salt;
B) a fluid selected from the group consisting of a non-polar fluid, a fluid of intermediate polarity, and combinations thereof; and
C) a component selected from the group consisting of an acid or components for forming an acid in situ in the subterranean location, a co-surfactant, and combinations thereof;
incorporating at least part of the hydrocarbons and synthetic oils into an incorporating fluid formulation selected from the set of components consisting of (1) the mesophase surfactant solution or the micellar solution, (2) the SPME, and (3) a different fluid formed in situ at the subterranean location, where the different fluid in (3) is formed in situ from the in situ fluid-forming components and is selected from the group consisting of microemulsions, nanoemulsions, macroemulsions, miniemulsions, swollen micellar dispersion, multiple emulsions, and combinations thereof; and
removing the incorporating fluid incorporating non-polar material from the subterranean location;
where the at least one linker of the selected set of components is selected from the group consisting of amines, carboxylic acids, dicarboxylic acids, saturated and unsaturated fatty acids, alcohols with more than 8 carbon atoms, glycols, polyols, phenols, toluene sulfonate, and combinations thereof, and the at least one linker of the selected set of components is different from the at least one surfactant of the selected set of components and where the concentration of the linker of the selected set of components ranges from about 0.1 vol % to about 5 vol %;

where the high-density brine of the selected set of components has a density higher than 16 lb/gal up to about 21 lb/gal; and where the incorporating fluid is a thermodynamically stable, macroscopically homogeneous mixture of at least four components, where the four components are: a polar phase from a polar fluid, a non-polar phase from the hydrocarbons and synthetic oils, the at least one linker of the selected set of components, and the at least one surfactant of the selected set of components; and where the at least one surfactant of the selected set of components is selected from the group consisting of nonionic surfactants selected from the group consisting of alkyl polyglycosides, sorbitan esters, methyl glucoside esters, polyglycol esters, and alcohol ethoxylates;

anionic surfactants selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl disulfonates, alkylaryl disulfonates, alkyl disulfates, alkyl sulphosuccinates, alkyl ether sulfates, alkyl ether carboxylates, alkyl linear carboxylates, alkyl branched carboxylates, linear ether sulfates, branched ether sulfates, and alkylenediamides; and cationic surfactants selected from the group consisting of arginine methyl esters and alkanolamines; and mixtures thereof.

12. The method of claim 11 where the component is the co-surfactant, and wherein the co-surfactant is a surface active substance selected from the group consisting of mono or poly-alcohols, low molecular weight organic acids or amines, polyethylene glycol, low ethoxylation solvents and mixtures thereof.

13. The method of claim 11 where the salt in the high-density brine of the selected set of components is selected from formate salts, chloride salts, bromide salts, acetate salts, nitrate salts, phosphate salts, citrate salts, tartrate salts, iodide salts, glutamate salts, diglutamate salts, nitriloacetate salts, and combinations thereof.

* * * * *